(12) United States Patent
Willmann

(10) Patent No.: US 11,871,317 B2
(45) Date of Patent: Jan. 9, 2024

(54) METHOD FOR CONTROLLING A DATA INTERCHANGE BETWEEN A CONTROL DEVICE OF A MOTOR VEHICLE AND AN EXTERNAL DEVICE, CONTROL DEVICE FOR A MOTOR VEHICLE AND MOTOR VEHICLE HAVING SUCH A CONTROL DEVICE

(71) Applicant: AUDI AG, Ingolstadt (DE)

(72) Inventor: Konstantin Willmann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 162 days.

(21) Appl. No.: 17/430,607

(22) PCT Filed: Feb. 26, 2020

(86) PCT No.: PCT/EP2020/054962
§ 371 (c)(1),
(2) Date: Aug. 12, 2021

(87) PCT Pub. No.: WO2020/178087
PCT Pub. Date: Sep. 10, 2020

(65) Prior Publication Data
US 2022/0141631 A1  May 5, 2022

(30) Foreign Application Priority Data

Mar. 6, 2019 (DE) .................... 10 2019 203 011.4

(51) Int. Cl.
*H04W 4/50* (2018.01)
*H04W 4/40* (2018.01)
(Continued)

(52) U.S. Cl.
CPC ............ *H04W 4/50* (2018.02); *B60R 25/102* (2013.01); *B60R 25/24* (2013.01); *G07C 5/008* (2013.01);
(Continued)

(58) Field of Classification Search
CPC ........ H04W 4/50; H04W 4/40; B60R 25/102; B60R 25/24; B60R 2325/205; G07C 5/008; H04L 67/04; H04L 67/12
(Continued)

(56) References Cited

U.S. PATENT DOCUMENTS 10,210,689 B1 * 2/2019 Cermak ............. G07C 9/00309
10,305,770 B2    5/2019 McLaughlin et al.
(Continued)

FOREIGN PATENT DOCUMENTS

CN    102118414 A    7/2011
CN    102711042 A    10/2012
(Continued)

OTHER PUBLICATIONS

International Preliminary Report on Patentability directed to related International Patent Application No. PCT/EP2020/054962, completed Jan. 25, 2021, with attached English-language translation; 11 pages.
(Continued)

*Primary Examiner* — Hirdepal Singh
(74) *Attorney, Agent, or Firm* — Sterne, Kessler, Goldstein Fox P.L.L.C.

(57) ABSTRACT

The present disclosure relates to a method for controlling a data interchange between a control device of a motor vehicle and an external device. The motor vehicle has multiple vehicle functions each having at least one associated subservice. Based on the subservice, the respective vehicle function is performed and the data interchange with the external device takes place independently of the activity of the vehicle function. If the control device receives a deactivation signal for one of the vehicle functions, it deactivates this at least one vehicle function and checks whether one of the subservices is associated with at least one other vehicle (Continued)

function that is currently activated. If a subservice is not associated with a currently activated vehicle function, this subservice is deactivated, as a result of which the data interchange between the control device and the external device is terminated by this subservice.

10 Claims, 2 Drawing Sheets

(51) Int. Cl.
  *B60R 25/102* (2013.01)
  *B60R 25/24* (2013.01)
  *G07C 5/00* (2006.01)
(52) U.S. Cl.
  CPC ......... *H04W 4/40* (2018.02); *B60R 2325/205* (2013.01)
(58) Field of Classification Search
  USPC ........................................ 340/12.5
  See application file for complete search history.

(56) References Cited

U.S. PATENT DOCUMENTS

| | | | |
|---|---|---|---|
| 2004/0267410 A1* | 12/2004 | Duri | H04L 63/20 701/1 |
| 2011/0288724 A1 | 11/2011 | Falk | |
| 2015/0091378 A1* | 4/2015 | Bartoszewski | B60R 25/00 307/10.1 |
| 2015/0223273 A1* | 8/2015 | Macdonald | H04W 4/48 370/252 |
| 2015/0333787 A1 | 11/2015 | Ma et al. | |
| 2017/0169823 A1 | 6/2017 | Neff | |
| 2020/0079322 A1* | 3/2020 | Crocker | G07C 9/00571 |
| 2021/0139041 A1* | 5/2021 | Blumentritt | B60W 30/18163 |

FOREIGN PATENT DOCUMENTS

| | | |
|---|---|---|
| CN | 105981352 A | 9/2016 |
| DE | 102015002248 A1 | 8/2015 |
| DE | 102016200815 A1 | 6/2017 |

OTHER PUBLICATIONS

International Search Report and Written Opinion of the International Searching Authority directed to related International Patent Application No. PCT/EP2020/054962, dated May 18, 2020, with attached English-language translation; 20 pages.

Wirawan, Made I et al., "IoT Communication System using Publish-Subscribe" International Seminar on Application for Technology of Information and Communication, IEEE, Sep. 21, 2018, XP033459358; pp. 61-65.

* cited by examiner

METHOD FOR CONTROLLING A DATA INTERCHANGE BETWEEN A CONTROL DEVICE OF A MOTOR VEHICLE AND AN EXTERNAL DEVICE, CONTROL DEVICE FOR A MOTOR VEHICLE AND MOTOR VEHICLE HAVING SUCH A CONTROL DEVICE

TECHNICAL FIELD

The present disclosure relates to a method for controlling a data interchange between a control device of a motor vehicle and an external device, a control device for a motor vehicle which is configured to carry out such a method, and a motor vehicle with such a control device.

BACKGROUND

Under existing rules for the processing of personal data by private companies or public institutions, such as those specified by the General Data Protection Regulation (GDPR) of the European Union, in connection with vehicle functions of motor vehicles, the performance of which includes a data interchange between the motor vehicle and an external device and which are often designated as online services, the question arises of how to ensure that these rules are followed and that data is only interchanged with the external device in the motor vehicle if a user of the motor vehicle wishes and allows this.

US 2015/0333787 A1 shows a method and a system with which online services can be carried out. In this case, a request for an online service is transmitted by means of a mobile communication device that is connected to a vehicle-based system. The corresponding content is received by the on-board system. It is particularly relevant here that the access of online services to the on-board system depends on the vehicle's capability and compatibility with such online services.

US 2011/0288724 A1 describes a device and a method that are used to authorize an online service while a motor vehicle is being driven. In this case, whenever a message or a request for a download is transmitted by the online service to the motor vehicle, the driving status of the motor vehicle is checked.

However, this does not take into account that each online function, which is designated below as a vehicle function, is assigned one or more subservices, on the basis of which the respective vehicle function is carried out. A data interchange between a control device of the motor vehicle and an external device takes place independently and regardless of whether the vehicle function is currently activated or deactivated by a respective subservice. As a result of an activated subservice, for example, even if a vehicle function is not currently activated, corresponding data collection and data transmission from the motor vehicle to the external device occurs. However, such activity of a subservice when the vehicle function is inactive is not permitted according to the GDPR, for example, and should be prevented.

BRIEF DESCRIPTION OF THE DRAWINGS/FIGURES

DETAILED DESCRIPTION

Figure 1:
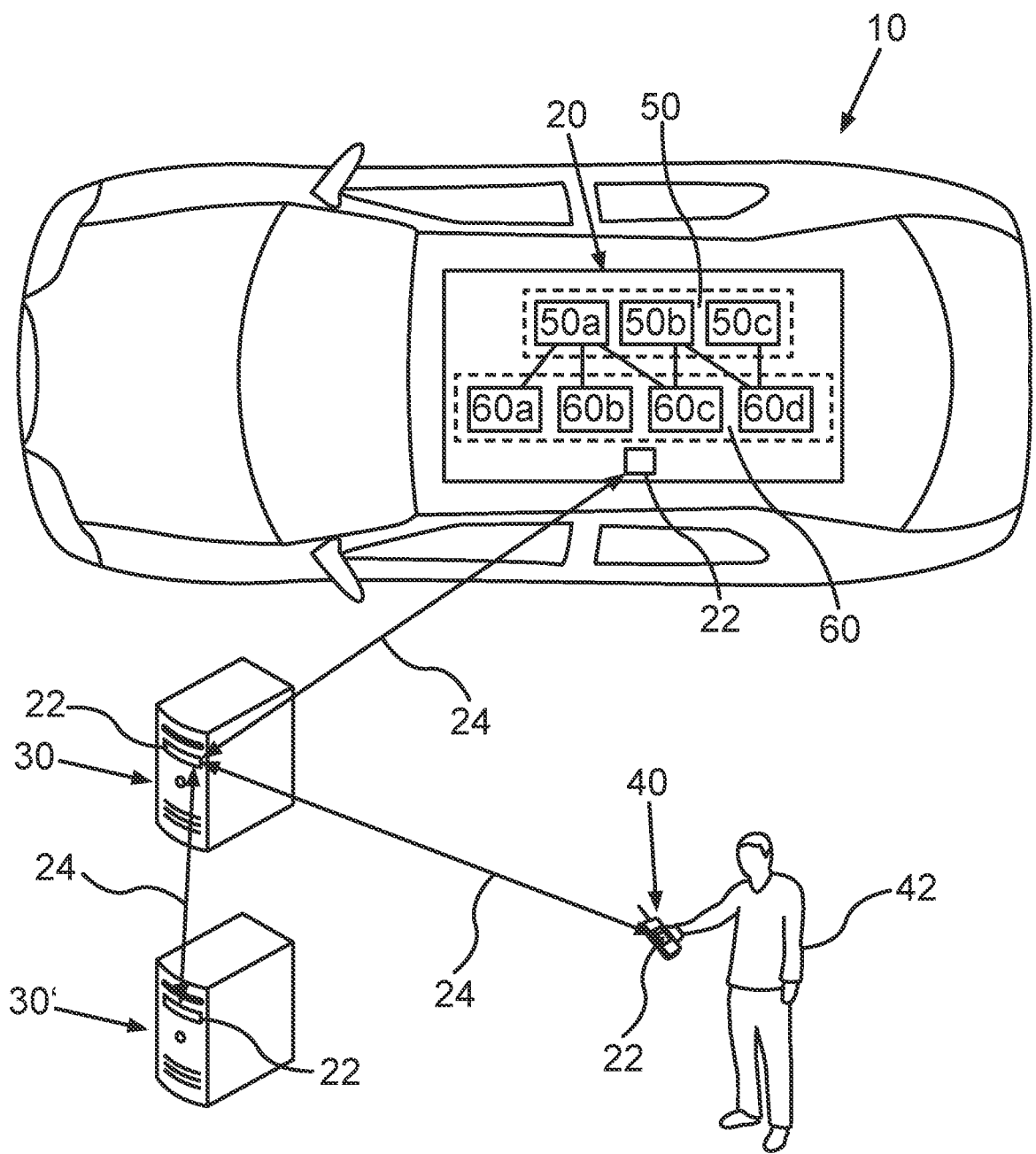
FIG. 1 is a schematic representation of a motor vehicle with a control device that enables data interchange with an external device.

The object of the present disclosure is to provide a solution to control a data interchange between a control device of a motor vehicle and an external device.

This object is achieved by the subject matter of the independent claims. Advantageous embodiments of the present disclosure are set forth in the dependent claims, the following description, and figures.

According to the present disclosure, a method for controlling a data interchange between a control device of a motor vehicle and an external device is described. This external device can be in the form of an external server device, via which, for example, user requests transmitted by a user mobile terminal can be provided to the control device of the motor vehicle. The control device can be used to carry out several vehicle functions, such as remote control of a door locking system of the motor vehicle, a vehicle heating system that can be switched on and off by remote control, or a request for current weather data in the motor vehicle, taking into account the current vehicle location of the motor vehicle. Each of these vehicle functions is assigned at least one subservice which can be used by several vehicle functions. In the motor vehicle, several subservices are provided, such as a door status indicator, a task request service set to inquire the external device whether this is a remote-controlled command for the motor vehicle, an authentication service set to check whether a communication connection between the external device and the motor vehicle is permitted, or a status data transmission service set, for example, to request a current position of the motor vehicle and other vehicle parameters, such as a tank filling level, a state of charge of a battery or a temperature of a vehicle interior, from corresponding sensor devices of the motor vehicle and to transmit them to the external device.

The corresponding vehicle function is performed based on the at least one subservice assigned to the vehicle function. Through this subservice, the data interchange between the control device and the external device takes place independently and regardless of whether the vehicle function is currently activated or deactivated. Thus, after the respective subservice has been activated the respective subservice is configured, for example, to transmit data collected from the external device continuously or at certain time intervals. For example, if a remote-controlled opening of the door locking system of the motor vehicle has been activated as a vehicle function by the user of the motor vehicle, the door status indicator, the authentication service, and the task request service are activated as subservices of the door status indicator.

The method for controlling the data interchange between the control device of the motor vehicle and the external device comprises the following steps: If the control device receives a deactivation signal for at least one of the vehicle functions, the control device deactivates this at least one vehicle function. For example, after having checked the status of the door locking system of the motor vehicle with the aid of a corresponding request using a mobile phone, the external device reports that the user of the motor vehicle has closed the corresponding application on his mobile phone again and consequently no longer desires remote-controlled access to the door locking system, and provides the deactivation signal. The deactivation signal is transmitted from the external device to the motor vehicle, for example at the request of the task request service.

After the vehicle function, which, as assumed in this example, enables remote-controlled access to the door locking system, has been deactivated, the next step is to check whether the at least one subservice that is assigned to the activated vehicle function is assigned to at least one other vehicle function that is currently activated. For example, checking whether there is another currently active vehicle function in the motor vehicle that also wishes to access the task request service. If, for example, the vehicle heating that can be switched on and off by remote control is activated at the same time, the task request service is still required by this function, then that respective subservice should remain activated. In contrast, if the door status indicator is no longer required by the vehicle heating system that is still active and can be switched on and off by remote control, then the respective subservice is no longer required by any currently activated vehicle function, since it is not assigned to any currently activated vehicle function.

If the at least one subservice is not assigned to a currently activated vehicle function, the control device deactivates the at least one subservice and terminates the data interchange between the control device and the external device that took place through the at least one subservice. In this example, the control device would recognize that the door status indicator is no longer required by an active vehicle function and would then terminate this subservice by deactivating it and thereby preventing the door status from being reported to the external device. This prevents this data interchange, which no longer has a legal basis, from continuing to take place.

The method according to the present disclosure includes both vehicle functions controlled by remote control and vehicle functions of the motor vehicle controlled and used in the motor vehicle itself and exchange data between the motor vehicle and the external device, for which purpose, for example, data must first be collected.

The method provides that the transmission behavior, or data interchange between the control device and the external device, can be controlled as required and ultimately monitored. This is because the method prevents the external device from being able to record status data unnecessary for executing the currently active vehicle function and may not be desired by the user of the motor vehicle. For example, the user's indication to deactivate a remotely controllable vehicle function from the user's mobile device ensures that the various subservices that the user often does not have directly displayed, and the details and availability of which the user may not be aware, are also switched off. This has the effect that at any point in time only the vehicle functions and the corresponding subservices are activated which have to be active in order to be able to carry out the currently desired vehicle functions and which consequently have a corresponding legal basis. Ultimately, the method according to the present disclosure thus enables any data acquisition by the external device from the on-board control device to be advantageously monitored.

The present invention also includes further embodiments which offer additional advantages.

In some aspects of the present disclosure, if the control device receives an activation signal for at least one of the vehicle functions, the control device activates this at least one vehicle function. For example, if the user of the motor vehicle wishes to activate the vehicle heating that can be switched on and off by remote control, a corresponding signal in the form of the activation signal is transmitted from the external device to the control device, whereupon the corresponding vehicle function in the motor vehicle is activated. It is also checked whether the at least one subservice assigned to the vehicle function is already activated, and if the at least one subservice assigned to the activated vehicle function is currently deactivated, the at least one subservice is activated and, as a result, the data interchange between the control device and the at least one subservice performed by the external device is started.

After the activation of the vehicle heater that can be switched on and off by remote control has taken place, the control device will first check whether all of the subservices required for this vehicle function have already been activated. If, for example, the task request service required for this and the subservice for authenticating the communication connection between the control device and the external device are already active, because, for example, the user has sent a query about the status of the door locking system in addition to his request regarding the setting of the vehicle heating, these two subservices mentioned no longer have to be activated because they are already in an activated state. A heating status indicator, which for example transmits a current temperature of the vehicle seats to the external device, has so far been inactive, which means that it is currently not required by any other vehicle function. After the activation signal has been received by the control device, the control device will activate the particular subservice. For example, the heating status indicator subservice will be activated and send out corresponding status messages to the external device.

This ensures that when a vehicle function is activated, all of the subservices assigned to this vehicle function are or will be activated, so that the activated vehicle function can be carried out. Each subservice that has a legal basis at least at a current point in time is thus activated, whereas each subservice that is no longer required by any active vehicle function is deactivated. This ultimately enables the data acquisition of the external device to be activated as required by the control device of the motor vehicle. This advantageously ensures that the vehicle functions are fully functional at all times with the support of the required subservices.

In some aspects of the present disclosure, the deactivation signal or the activation signal for at least one vehicle function is generated by an input of a user of the motor vehicle on an operating device in the motor vehicle and is transmitted to the control device internally in the vehicle. A user interface, such as a touchscreen or a display device with respective keys and/or rotary switches, can therefore be provided in the motor vehicle, and allow the vehicle function being deactivated or activated when an actuating element of this operating device is actuated. For example, the user can access a weather forecast display for a current vehicle location, whereupon the current vehicle location is transmitted to the external device by means of appropriate subservices and corresponding weather forecast data are received from the external device. An analog data interchange with the external device is activated or deactivated when current messages are displayed in the motor vehicle at the request of the user. As an alternative or in addition to this, implementing a vehicle function that includes data interchange with the external device, can be activated and/or deactivated independently of an input by the user. For example, when a navigation system of the motor vehicle retrieves current traffic flow data from the external device for route planning and/or map display. The user of the motor vehicle does not always actively activate this vehicle function, but it can be activated automatically within the framework of an activated navigation system. This ensures that unrequired subservice(s) are not activated in the motor vehicle.

Additionally, the user's input to generate the deactivation or activation signal for the at least one vehicle function may be input by the operating device in the motor vehicle and/or a mobile terminal wherein the transmission of the generated deactivation signal or activation signal takes place via the external device to the control device of the motor vehicle. The user thus has the option of activating the remotely controllable vehicle function with a corresponding input, for example by touching a touch-sensitive display of a mobile phone using an application configured for this purpose, wherein with a first access and with ending of the individual input the user causes the activation signal or the deactivation signal to be transmitted.

However, the user input is not transmitted as a corresponding control signal directly from the user's mobile device to the control device or to the communication device of the control device of the motor vehicle, but is initially only made available to the external device. The communication with regard to the vehicle function therefore always takes place via the external device, which serves at least as a transmitter of corresponding control signals, i.e., the deactivation signal or the activation signal. This allows the data interchange between the control device of the motor vehicle and the external device to be controlled in an advantageous manner using the method according to the present disclosure without restricting data interchange between the user's mobile device and the external device, since any forwarding of status data or other data collected in the motor vehicle is already carried out by corresponding checking of the various subservices of the vehicle functions in the control device itself. The check as to whether existing regulations with regard to the processing of personal data relating to the data collected by the motor vehicle are complied with can thus be implemented in the control device of the motor vehicle independently of settings and their implementation in the user's mobile terminal.

A particularly advantageous embodiment of the present disclosure provides that inputs from the user on the mobile terminal transmitted to the external device are only transmitted to the control device upon request from the control device in the external device. Therefore data is not transmitted from the mobile terminal to the external device then directly to the control device of the motor vehicle at predetermined time intervals or at any times when data are transmitted from the mobile terminal to the external device. Rather, the external device only uses a message to inform the motor vehicle that there is at least one request and/or an order for it, if applicable. Then, for example, with the help of the task request service of the motor vehicle, the external device retrieves the at least one request and/or the at least one task stored there for the motor vehicle. In this way, for example, the probability of unwanted, unauthorized access and, above all, an associated unauthorized and unwanted query of data recorded by the sub services can be prevented, since any remotely transmitted vehicle function signals are only made available to the control device if this device requests such control signals.

Furthermore, one embodiment of the present disclosure provides that the deactivation signal and/or the activation signal for the at least one vehicle function is generated by the external device or a further external device and is transmitted to the control device via the external device. In addition or as an alternative to an input by a user of the motor vehicle on the operating device in the motor vehicle and/or on its mobile terminal, it is therefore possible for the external device itself or a further external device to access one of the vehicle functions of the motor vehicle. For example, the vehicle manufacturer may request to transmit a request for data that can be collected internally by the motor vehicle via another external server device of the vehicle manufacturer in order to analyze corresponding data with regard to a product improvement.

For example, in order to optimize a sliding roof control of the motor vehicle, it can be useful for a vehicle manufacturer to request data from a motor vehicle, which include when and to what extent an automatic sliding roof opening function is used by the user of the motor vehicle. Corresponding data can, for example, be stored in the control device and made available to a further server device of the vehicle manufacturer via the external device with a subservice that is configured, for example, to transmit vehicle status data to the external device. In particular, it can be provided here that such data are only collected and/or passed on taking account of a corresponding approval by the user of the motor vehicle. The user of the motor vehicle is thus free to allow such data collection, for example from the vehicle manufacturer of the motor vehicle, by agreeing to this. This allows data required for product improvement to be collected and transmitted from the motor vehicle to the external device, taking into account the existing rules for processing of personal data by private companies in the case of a corresponding authorization, i.e. in the case of a corresponding approval by the user of the motor vehicle. Status data of the motor vehicle can thus be forwarded to the external device even without a vehicle function desired by the user being deactivated and activated by the user himself. In addition to the vehicle manufacturer using the data for product improvement, other data collection services may be used to evaluate frequently traveled road routes for the optimization of navigation systems.

In a particularly advantageous embodiment of the present disclosure, a link between each vehicle function and the relevant at least one subservice is stored in the control device. Each vehicle function is consequently assigned a stored number of subservices that support it. These links can, for example, be stored in a database in which all subservices assigned to this vehicle function are listed for each vehicle function. The control device now checks on the basis of the stored link whether the at least one subservice that is assigned to the deactivated vehicle function is assigned to at least one other vehicle function that is currently activated. In particular, the control device checks whether the at least one subservice assigned to the vehicle function is already activated based on the stored link.

In the case of a deactivation signal or an activation signal received by the control device relating to one of the vehicle functions, the checking steps already described above are carried out by first comparing them with the database in which the link between each vehicle function and the respective at least one subservice is stored. As a result, information regarding how the various subservices are related to the vehicle functions is stored in the control device. The database can also be used to transparently track which subservices actually have to be activated for which activated vehicle functions and which should be deactivated since they lack the legal basis for their activated state. In this way, the data interchange between the control device and the external device can be controlled in a particularly short time and very reliably, since an assignment of the subservices to the individual vehicle functions is clearly stored and retrieved quickly.

An additional embodiment of the present disclosure provides that the stored link between each vehicle function and the particular at least one subservice is displayed to the user of the motor vehicle on a display device of the motor vehicle and/or the user's mobile terminal in response to a corresponding request from the user. The user therefore has the option of displaying the individual vehicle functions and the associated sub services, for example by activating a display function using an operating device of the motor vehicle on a display device of the motor vehicle, for example a display in a center console of the motor vehicle. It is also possible for a current activation status of the relevant vehicle function and the relevant subservices to be displayed.

Additionally, the user can also have this information displayed on a mobile terminal in the application required for remote control of the vehicle function on the mobile terminal. It is particularly advantageous that such information displays are only displayed in response to a corresponding request by the user, which can be actively selected, for example, by a corresponding selection in a menu function of the selected display device. In this way, transparency of the interlinking between the vehicle function and subservices guarantees optimal transparency for the user of the motor vehicle. A user who is not interested in the information mentioned is, however, not undesirably confronted with this information and possibly bored.

In a further embodiment of the present disclosure, the subservice obtains status data of the motor vehicle and/or a communication connection between the control device of the motor vehicle and the external device, stores it for at least a predetermined time, and transmits it to the external device. Thus, the individual subservices can collect data relating to the vehicle, such as by requesting corresponding data from sensor devices of the motor vehicle. These data are then stored, at least temporarily, in the control device and shared in the form of data interchange with the external device. The status data include, for example, a current vehicle position, i.e. the current standing position of the vehicle determined by the global positioning system (GPS), a door lock status of the individual doors and/or the trunk of the motor vehicle, a security certificate of the communication connection between the external device and the control device, a current temperature of a seat of the motor vehicle, information on a current security update of the encrypted communication connection between the external device and the control device, a timer function that enables certain vehicle functions to be started at a specific predetermined time, a current filling level of a fuel tank or a state of charge of a battery in the motor vehicle. However, the status data of the motor vehicle or the communication connection available to the respective subservices are not only used for internal data exchange within the motor vehicle, but are transmitted to the external device. The subservices thus advantageously enable the data interchange with the external device that is required in order to carry out the vehicle function in the motor vehicle.

The present disclosure further relates to a control device for a motor vehicle, which is configured to control a data interchange between the control device and an external device when the control device is configured to carry out several vehicle functions, to which in each case at least one subservice provided for use by several vehicle functions is assigned. The relevant vehicle function is carried out on the basis of this subservice and the data interchange between the control device and the external device takes place independently and regardless of whether the vehicle function is currently activated or deactivated. If the control device receives a deactivation signal for at least one of the vehicle functions, it is configured to deactivate this at least one vehicle function and to check whether the at least one subservice to which the deactivated vehicle function is assigned is assigned to at least one other vehicle function that is currently activated. In addition, if the at least one subservice is not assigned to any currently activated vehicle functions, the control device is configured to deactivate this at least one subservice and end the data interchange between the control device and the external device that took place through the at least one subservice. The preferred embodiments presented in connection with the method according to the present disclosure and the advantages of these embodiments apply accordingly, if applicable, to the control device according to the present disclosure. For this reason, further corresponding developments of the control device according to the present disclosure are not described again here. The control device has a processor device which is set up to carry out an embodiment of the method according to the present disclosure. For this purpose, the processor device can comprise at least one microprocessor and/or at least one microcontroller. Furthermore, the processor device can include a program code configured to carry out the embodiment of the method according to the present disclosure when executed by the processor device. The program code can be stored in a data memory of the processor device.

The present disclosure also relates to a motor vehicle with a control device as described above. This control device is therefore configured to carry out the method according to the present disclosure described above. The preferred embodiments presented in connection with the method according to the present disclosure and the control device according to the present disclosure for a motor vehicle and the advantages of these embodiments apply accordingly to the motor vehicle according to the present disclosure, if applicable. For this reason, further corresponding developments of the motor vehicle according to the present disclosure are not described again here.

The motor vehicle according to the present disclosure is preferably configured as a car, in particular as a passenger car or truck or as a passenger bus or motorcycle.

The present disclosure also comprises the combinations of the features of the described embodiments.

The embodiments explained below are preferred embodiments. In the embodiments, the described components of the embodiments each represent individual features are to be considered to be independent of one another. Furthermore, the described embodiments may also be supplemented by further features as already described.

In the drawings, the same reference signs refer to functionally identical elements.

A motor vehicle 10 which comprises a control device 20 is sketched in FIG. 1.

This control device 20 comprises a communication interface 22, via which a communication connection 24 to the communication interface 22 of an external device 30, which in this example is a server device. The motor vehicle 10 has several vehicle functions 50, which are differentiated as vehicle functions 50a to 50c. The vehicle functions 50a to 50c are each configured to be controlled remotely. The vehicle functions 50a to 50c shown here by way of example include a door lock control function 50a, a status report function 50b and a vehicle finder function 50c. The control device 20 carries out the individual vehicle functions 50*a* to 50*c* which can be activated or deactivated remotely via the external device 30. Additionally, the at least one vehicle function 50 can be activated or deactivated in the motor vehicle 10. This can be, for example, a weather forecast display function, a traffic flow display function, or a message display function for displaying current messages.

Furthermore, the motor vehicle 10 has several subservices 60, which are differentiated as subservices 60*a* to 60*d*. A door status indicator 60*a*, a communication security service 60*b*, a task request service 60*c* and a status data transmission service 60*d* are shown here by way of example. Each of the remotely controllable vehicle functions 50*a* to 50*c* is assigned to at least one subservice 60*a* to 60*d* which are provided for use by a plurality of vehicle functions 50*a* to 50*c*, based on the relevant vehicle function 50*a* to 50*c* to be carried out. Through this subservice 60*a* to 60*d*, a data interchange via the communication connection 24 between the control device 20 and the external device 30 is carried out independently and regardless of whether the vehicle function 50*a* to 50*c* is currently activated or deactivated.

Activation and deactivation of individual vehicle functions 50*a* to 50*c* take place at the request of a user 42. The user 42 can make a corresponding input on a mobile terminal 40, which is then transmitted via the communication interface 22 of the mobile terminal 40 via the communication connection 24 to the communication interface 22 of the external device 30. As soon as the external device 30 has received such a request from the user 42, it informs the control device 20 of the motor vehicle 10 that there may be a task for one of the vehicle functions 50*a* to 50*c*. The control device 20 then initiates a task request which it transmits to the external device 30. A corresponding activation or deactivation signal, which can be traced back to the input of the user 42, is then transmitted from the external device 30 to the control device 20. According to the activation signal, the door lock control function 50*a* is now activated, for example.

Figure 2:
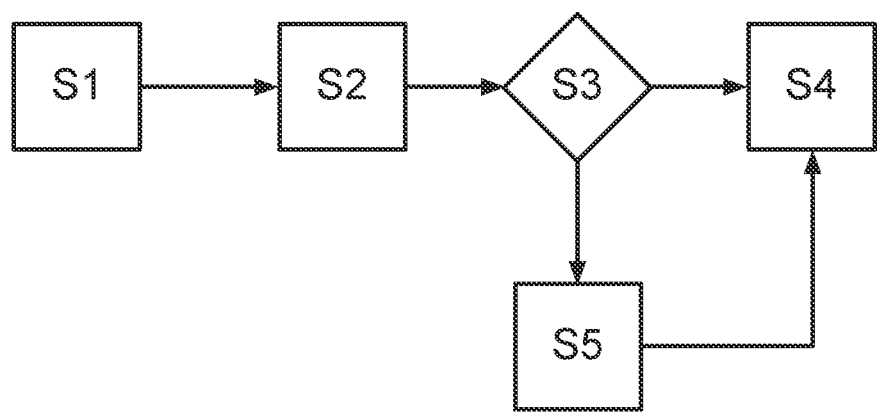
FIG. 2 is a schematic representation of a signal flow graph for a method for activating a vehicle function of a motor vehicle.

FIG. 2 outlines the individual method steps in the case of activation of the vehicle function 50*a*. In this example, the status report function 50*b* and the vehicle finder function 50*c* are already activated. The corresponding subservices 60*c* and 60*d* are thus also already in an active operating state. The control device 20 for the vehicle function 50*a* first receives the activation signal. This takes place in step S1. The control device 20 then activates the door lock control function 50*a* in method step S2. In a next step S3, the control device checks whether one of the subservices 60*a* to 60*d*, which is assigned to the door lock control function 50*a*, is already activated. In this example, the task request service 60*c* is already activated due to the activated state of the status report function 50*b*. However, the door status indicator 60*a* and the communication security service 60*b* are still deactivated. The status transmission service 60*d* is not assigned to the door lock control function 50*a* and is therefore not taken into account in the following steps.

If at least one of the subservices 60*a* to 60*c* assigned to the door lock control function 50*a* is currently deactivated, subservice 60*a* to 60*c* is activated in step S5 and the data interchange between the control device 20 and the external device 30 carried out by this subservice 60*a* to 60*c* is started. In step S5, the door status indicator 60*a* and the communication security service 60*b* are therefore activated. In step S4, all of the subservices 60*a* to 60*c* assigned to the door lock control function 50*a* are activated.

Figure 3:
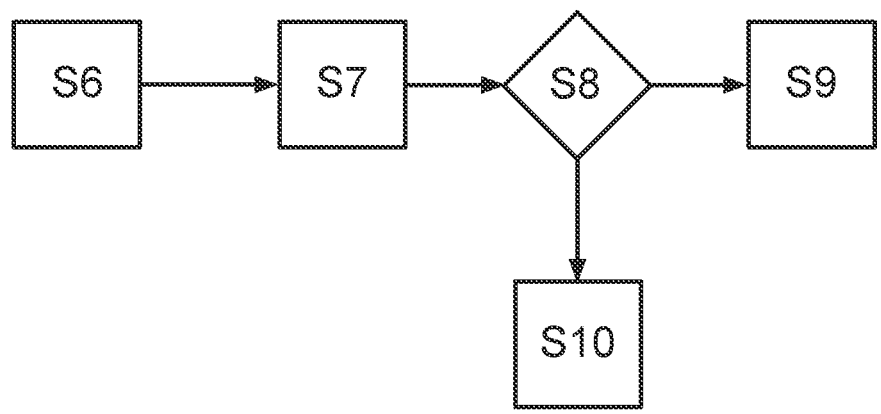
FIG. 3 is a schematic representation of a signal flow graph for a method for deactivating a vehicle function of a motor vehicle.

FIG. 3 shows steps S6 to S10 carried out if a deactivation signal is transmitted to the control device 20. In this example, the door lock control function 50*a*, the status report function 50*b* and the vehicle finder function 50*c* are activated at the beginning. The deactivation signal is received in step S6 for at least one of the activated vehicle functions 50*b* or 50*c*. For example, this is a deactivation signal for the status report function 50*b*, with which, for example, the user 42 previously inquired how the current state of charge of a high-voltage battery of the motor vehicle 10 is to be quantified. The user 42 ends this query and does not want any further status data from the motor vehicle 10, which is why the deactivation signal is transmitted in step S6. The status report function 50*b* receives the corresponding signals based on the activity of the task request service 60*c*, via which the state of charge inquiry was previously requested by the user 42 from the external device 30. In the next step S7, the control device 20 deactivates the status report function 50*b*. In the following step S8, the control device 20 then checks whether at least one of the subservices 60*c* and/or 60*d* that is assigned to the status report function 50*b* is assigned to at least one other vehicle function 50*a* or 50*c* that is currently activated. In this example, this is the case for the task request service 60*c*, which is still required by the door lock control function 50*a*, and for the status data transmission service 60*d*, which is still required by the vehicle finder function 50*c*. Since both subservices 60*c* and 60*d* of the status report function 50*b* are still required by at least one further vehicle function 50*a* to 50*c*, both subservices 60*c* and 60*d* remain active, which takes place in step S9.

If, in addition to deactivating the status report function 50*b*, the vehicle finder function 50*c* is also deactivated, since a corresponding deactivation signal was received in method step S6 and the control device 20 then deactivated the vehicle finder function 50*c*, then in checking step S8 it is determined that the status data transmission service 60*d* of any currently activated vehicle function 50*a* to 50*c* is no longer required, since this subservice 60*d* is not assigned to any vehicle function 50*a* to 50*c* that is still activated. Thereupon, in step S10, the status data transmission service 60*c* is terminated by the control device 20 and thereby the data interchange carried out by the status data transmission service 60*d*, i.e. in this case the determination and transmission of the current state of charge of the battery of the motor vehicle 10 and the current vehicle position from the control device 20 to the external device 30, is prevented. However, in this example, the task request service 60*c* remains active, since the door lock control function 50*a*, which is still active in this example, is assigned to it and is still required by it.

A further external device 30' is also included in FIG. 1, and likewise has the communication interface 22 and is configured to set up the communication connection 24 with the communication interface 22 of the external device 30. The deactivation and/or activation signal for one of the vehicle functions 50*a* to 50*c* can be generated either by the external device 30 itself or by the further external device 30'. If the deactivation and/or activation signal is generated by the further external device 30', this can be transmitted to the control device 20 via the external device 30. In this case, the data interchange is preferably only possible when the user 42 of the motor vehicle 10 has given appropriate approval. This allows, for example, for the vehicle position data of the motor vehicle 10 to be requested by the further external device 30' in order to examine the utilization of individual parking spaces in a parking garage.

A link between each vehicle function 50*a* to 50*c* and the relevant at least one subservice 60*a* to 60*d* is stored in the control device 20. In the checking steps S3 and S8 in FIGS.

2 and 3, on the basis of the stored links, the control device 20 then checks whether the at least one subservice 60a to 60d, which is assigned to the deactivated or activated vehicle function 50a to 50c, is assigned to at least one other vehicle function 50a to 50c that is currently activated, or whether the at least one subservice 60a to 60d assigned to the vehicle function 50a to 50c is already activated.

The user 42 can display the links stored in the motor vehicle 10 between each vehicle function 50a to 50c and the relevant at least one subservice 60a to 60d on a display device of the motor vehicle 10 configured for this purpose and/or on the mobile terminal 40 if he requests this in a corresponding request to the control device 20. The subservices 60a to 60d obtain status data of the motor vehicle 10 and/or the communication connection 24 between the control device 20 of the motor vehicle 10 and the external device 30, store these data at least for a predetermined period of time, and transmit them to the external device 30.

In addition to the vehicle functions 50a to 50c and subservices 60a to 60d mentioned numerous other vehicle functions 50 and subservices 60 are possible. Which vehicle function 50 and which associated subservices 60 are stored in detail in the motor vehicle 10 can be ascertained, for example, by means of a service list in the motor vehicle 10, from which it is possible to find all the vehicle functions 50 that the user 42 has booked for the motor vehicle 10 or that have been provided to him by the motor vehicle 10.

A device for deactivating and/or activating a vehicle function 50 can be located as described above in the mobile terminal 40, but also in an external front end, such as a web portal, or in the motor vehicle 10 itself. A deactivation of all usable vehicle functions 50 has the consequence that all subservices 60 are also deactivated. This includes, among other things, the subservice 60, which sets up the basic data connection. Once this has been deactivated, there is no longer any access from outside the motor vehicle 10, that is to say it is only possible to reactivate this subservice 60 in the motor vehicle 10 itself. It is therefore possible that the deactivation and/or activation of vehicle functions 50 in the motor vehicle 10 is also possible, whereby the subservices 60 are deactivated and/or activated as described. It should also be noted there are numerous vehicle functions 50 in the motor vehicle 10. A subset thereof is used internally in the motor vehicle 10, but another subset thereof is used externally, for example on the mobile terminal 40 for remote control of vehicle functions. However, all vehicle functions 50, that is to say both the internal and also the external functions, have subservices 60 for data interchange with the external device 30, and in some cases even the same subservices 60.

Overall, the examples show how a logical activation and deactivation of services, the vehicle functions 50a to 50c, can be implemented to comply with data protection regulations in the motor vehicle 10, with the focus being placed on the subservices 60a to 60d which, if applicable, despite deactivation of the vehicle function 50a to 50c at the customer's request, are usually still activated in conventional motor vehicles 10. For this purpose, all vehicle functions 50a to 50c are linked to one another, with properties and/or legal bases being inherited. In this context, each vehicle function 50a to 50c, which is often also designated as an online service or master, is assigned a set of supporting online services, the so-called subservices 60a to 60d, which can also be designated as slaves.

Furthermore, the examples show an algorithm for deciding which subservices 60a to 60d may or must remain active and which do not. If a vehicle function 50a to 50c is deactivated, each subservice 60a to 60d must also be deactivated, unless this subservice 60a to 60d is assigned to a further non-deactivated vehicle function 50a to 50c. However, if a vehicle function 50a to 50c is activated, all assigned subservices 60a to 60d must also be activated in order to ensure the function of the vehicle function 50a to 50c. The legal basis for the activation of the vehicle function 50a to 50c is usually a customer request by the user 42 to provide the vehicle function 50a to 50c or the user's consent to the collection of data. This data collection can take place, for example, by the further external device 30'. This legal basis also exists for the subservices 60a to 60d, which are required for full functioning of the desired vehicle functions 50a to 50c, whereby the legal basis can be inherited.

With the representation of the link between the vehicle function 50a to 50c and the subservices 60a to 60d, the user 42 can also see an optimally transparent interlinking between the vehicle function 50a to 50c and the subservices 60a to 60d. In this embodiment, supporting vehicle functions 50a to 50c can also be equated with authorizations or accesses of any kind. The subservices 60a to 60d are characterized in that they collect data based on the legal basis of the higher-level vehicle function 50a to 50c, since these data are required for the full functioning of the higher-level vehicle function 50a to 50c.

The invention claimed is:

1. A method for controlling a data interchange between a control device of a motor vehicle and an external device, the control device comprising a plurality of vehicle functions each assigned to at least one subservice, the method comprising:
   receiving a deactivation signal for a first vehicle function of the plurality of vehicle functions, and deactivating the first vehicle function;
   checking whether the at least one subservice assigned to the deactivated first vehicle function is assigned to a second vehicle function of the plurality of vehicle functions, the second vehicle function being currently activated;
   deactivating the at least one subservice if the at least one subservice is not assigned to the second vehicle function; and
   terminating the data interchange between the control device and the external device carried out by the at least one subservice;
   wherein:
   the data interchange between the control device and the external device takes place independently and regardless of whether the first vehicle function is currently activated or deactivated,
   corresponding data collection and data transmission from the control device to the external device occurs as a result of an activated sub service, even if the first vehicle function is not currently activated,
   a link between each of the plurality of vehicle functions and the at least one subservice is stored in the control device, and
   the checking whether the at least one subservice assigned to the deactivated first vehicle function is assigned to the second vehicle function is based on the stored link.

2. The method of claim 1, further comprising,
   activating the first vehicle function if the control device receives an activation signal for the first vehicle function; and
   checking whether the at least one subservice assigned to the first vehicle function is already activated, wherein if the at least one subservice assigned to the activated first vehicle function is currently deactivated, the at least one subservice is activated and thereby starting the data interchange by the at least one subservice between the control device and the external device.

3. The method of claim 2, wherein the deactivation signal or the activation signal for the first vehicle function is generated by an input of a user of the motor vehicle on an operating device in the motor vehicle and is transmitted to the control device internally in the motor vehicle or generated by an input by the user on a mobile terminal and transmitted to the control device via the external device.

4. The method of claim 3, wherein the input of the user on the mobile terminal transmitted to the external device is transmitted to the control device only on request from the external device.

5. The method of claim 2, wherein the deactivation signal or the activation signal for the first vehicle function is generated by the external device or a further external device, taking account of a corresponding approval by the user of the motor vehicle, and is transmitted to the control device via the external device.

6. The method of claim 1, further comprising checking whether the at least one subservice that is assigned to the first vehicle function is already activated based on the stored link.

7. The method of claim 1, wherein the stored link between each of the plurality of vehicle functions and the at least one subservice is displayed to a user of the motor vehicle on a display device of the motor vehicle or a user mobile terminal in response to a corresponding request from the user.

8. The method of claim 1, wherein the at least one subservice:
   obtains status data of the motor vehicle or a communication connection between the control device and the external device,
   stores the status data at least for a predetermined period of time, and
   transmits the status data to the external device.

9. A control device for a motor vehicle to control a data interchange between the control device and an external device and perform a plurality of vehicle functions, each of which is assigned at least one subservice provided for use by several of the plurality of vehicle functions, the control device comprising:
   a processor and a memory, such that the processor:
      receives a deactivation signal for a first vehicle function of the plurality of vehicle functions and deactivates the first vehicle function;
      checks whether the at least one subservice assigned to the deactivated first vehicle function is assigned to a second vehicle function of the plurality of vehicle functions, the second vehicle function being currently activated;
      deactivates the at least one subservice if the at least one subservice is not assigned to the second vehicle function; and
      terminates the data interchange between the control device and the external device carried out by the at least one subservice;
   wherein:
      the data interchange between the control device and the external device is automatic regardless of whether the first vehicle function is currently activated or deactivated,
      corresponding data collection and data transmission from the control device to the external device occurs as a result of the activated subservice, even if the first vehicle function is not currently activated,
      a link between each of the plurality of vehicle functions and the at least one subservice is stored in the control device, and
      the checking whether the at least one subservice assigned to the deactivated first vehicle function is assigned to the second vehicle function that is currently activated is based on the stored link.

10. The control device of claim 9, wherein the control device is contained in the motor vehicle.

* * * * *